US012604904B2

(12) United States Patent
Wise et al.

(10) Patent No.: US 12,604,904 B2
(45) Date of Patent: Apr. 21, 2026

(54) GEL CAPSULES INCLUDING SILICA GEL, AND RELATED METHODS

(71) Applicant: BOARD OF TRUSTEES OF MICHIGAN STATE UNIVERSITY, East Lansing, MI (US)

(72) Inventors: John C. Wise, Bath, MI (US); Christine Vandervoort, Williamston, MI (US); Annabel G. Wise, Bath, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 445 days.

(21) Appl. No.: 18/022,588

(22) PCT Filed: Aug. 24, 2021

(86) PCT No.: PCT/US2021/047231
§ 371 (c)(1),
(2) Date: Feb. 22, 2023

(87) PCT Pub. No.: WO2022/046684
PCT Pub. Date: Mar. 3, 2022

(65) Prior Publication Data
US 2023/0354821 A1      Nov. 9, 2023

Related U.S. Application Data

(60) Provisional application No. 63/069,234, filed on Aug. 24, 2020.

(51) Int. Cl.
*A01N 63/60*        (2020.01)
*A01N 25/26*        (2006.01)

(52) U.S. Cl.
CPC ............. *A01N 63/60* (2020.01); *A01N 25/26* (2013.01)

(58) Field of Classification Search
CPC ........... A01N 63/60; A01N 25/26; A01G 7/06
See application file for complete search history.

(56) References Cited

U.S. PATENT DOCUMENTS

| | | | |
|---|---|---|---|
| 5,658,548 A | 8/1997 | Padhye et al. | |
| 2006/0142157 A1 | 6/2006 | Birthisel et al. | |
| 2008/0187565 A1 | 8/2008 | Hill et al. | |
| 2010/0083570 A1* | 4/2010 | Doolittle .................. | A01G 7/06 47/57.5 |
| 2018/0023076 A1 | 1/2018 | Ghosh et al. | |
| 2019/0343122 A1* | 11/2019 | Coelho .................. | A01N 37/06 |
| 2020/0128820 A1 | 4/2020 | Wise et al. | |

FOREIGN PATENT DOCUMENTS

| | | |
|---|---|---|
| WO | WO-2018/169904 A1 | 9/2018 |
| WO | WO-2019/162163 A1 | 8/2019 |

OTHER PUBLICATIONS

U.S. Appl. No. 18/022,586, filed Feb. 22, 2023, Wise et al.
U.S. Appl. No. 18/022,589, filed Feb. 22, 2023, Wise et al.
Andrade et al., RNA Interference—Natural Gene-Based Technology for Highly Specific Pest Control (HiSPeC), Chapter 19, RNA Interference (2016).
Boom et al., Rapid and simple method for purification of nucleic acids, Journal of Clinical Microbiology, 28(3):495-503 (1990).
Castillo et al., Rapid isolation of mycoviral double-stranded RNA from Botrytis cinerea and *Saccharomyces cerevisiae*, Virology Journal, 8:38 (2011).
International Application No. PCT/US2021/047231, International Search Report and Written Opinion, mailed Feb. 7, 2022.
RNeasy® Mini Handbook, Qiagen, 100 pages, Oct. 2019.
Sherman et al., RNAi technologies in agricultural biotechnology: The Toxicology Forum 40th Annual Summer Meeting, Regulatory Toxicology and Pharmacology, 73:671-80 (2015).
Tan et al., DNA, RNA, and Protein Extraction: The Past and the Present, Journal of Biomedicine and Biotechnology, vol. 2009, Article ID 574398 (2009).
Tzanetakis et al., A new method for extraction of double-stranded RNA from plants, Journal of Virological Methods, 149(1):167-70 (2008). Abstract Only.
Ghosh et al., Double-stranded RNA oral delivery methods to induce RNA interference in phloem and plant-sap-feeding Hemipteran insects, Journal of Visualized Experiments, 135:e57390 (2018).
Hunter et al., Subtropical insects and horiticulture research: Fort Pierce, FL, Southwestern Entomologist, 37(1):85-87 (2012). Abstract Only.

* cited by examiner

*Primary Examiner* — Michael B. Pallay
(74) *Attorney, Agent, or Firm* — MARSHALL, GERSTEIN & BORUN LLP

(57) ABSTRACT

The disclosure relates to gel capsules for delivery of one or more dsRNA plant protection materials to internal tree tissue of, for example, fruit trees. The gel capsules generally include a powdered matrix comprising silica gel, dsRNA (double-stranded RNA) bound to the powdered matrix, and, a capsule shell containing the powdered matrix with the bound dsRNA therein. The disclosure also relates to methods of preparing the gel capsules, and methods for delivering a dsRNA plant protection material to trees. After injection into the tree trunk, the gel capsules can provide a uniform, relatively consistent dose of dsRNA to all parts of the tree throughout the growing season, thus reducing waste of material and cost.

20 Claims, 6 Drawing Sheets

GEL CAPSULES INCLUDING SILICA GEL, AND RELATED METHODS

CROSS REFERENCE TO RELATED APPLICATION

This application is a U.S. National Stage of PCT/US21/47231, filed Aug. 24, 2021, which claims priority to U.S. Provisional Application No. 63/069,234 filed on Aug. 24, 2020, both of which are incorporated herein by reference in their entireties.

STATEMENT OF GOVERNMENT INTEREST

None.

BACKGROUND OF THE DISCLOSURE

Field of the Disclosure

The disclosure relates to gel capsules for delivery of one or more dsRNA plant protection materials to internal tree tissue. The disclosure also relates to methods of preparing the gel capsules and methods for delivering for a dsRNA plant protection material to a tree using the gel capsules.

Brief Description of Related Technology

Tree fruit producers currently rely on airblast ground sprayers to deliver pesticides to their orchards in order to control insects and disease pests. However, these airblast sprayers typically provide only 29% to 56% of the applied spray solution to the tree canopy, while the remaining solution drifts to the ground or other off-target end points. Pest management inputs comprise about 30% or more of the total annual variable costs in fruit production, and they significantly influence marketable yield. Trunk injection represents an alternate technology for the delivery of pesticides to tree fruit crops. Arborists have developed a variety of techniques for injecting pesticides directly into tree trunks, which then can be translocated from the injection site to the canopy area of insect feeding or disease infection. This technology has been successfully used in protecting ash trees from the Emerald ash borer (EAB) in urban and suburban landscapes because of minimal risks of applicator exposure, drift and impacts on non-target organisms, and superior duration of control compared to foliar application.

The commercial ARBORJET QUIK-JET system relies upon drilling a hole in the trunk, and injecting a pesticide solution into the cavity, after which the xylem translocates the material to the tree canopy. The ARBORSYSTEMS WEDGLE drills a shallow hole into the tree trunk, and then makes a pressure injection of liquid solution into the cambial zone of the trunk. These types of injection techniques result in a temporally variable residue profile in the tree canopy, resulting in unnecessarily high doses of insecticide. Another trunk injection technology, the ACECAP Systemic Insecticide Tree Implant, inserts a capsule containing the pesticide into the tree trunk. After the pesticide is released, however, the capsule remains as a contaminant that hinders tree healing. Both of these commercial systems can cause unacceptable injury to the tree trunk, thus hindering potential adoption in the tree fruit industry. The commercial BITE-INFUSION system avoids drilling large holes in the tree by slowly infusing the pesticide into the trunk with a needle-based system and pressure. This system can require an inordinate amount of time to inject a single tree, thus lower its potential for use in a tree fruit orchard system.

Accordingly, it would be desirable to provide a uniform dose of pesticide active ingredient to the tree throughout the growing season in a time- and labor-efficient manner which also enhances the healing of the tree after injection.

SUMMARY

In one aspect, the disclosure relates to a gel capsule for delivery of one or more dsRNA plant protection materials to internal tree tissue, the gel capsule comprising: (a) a powdered matrix comprising silica gel; (b) dsRNA (double-stranded RNA) bound to the powdered matrix, the dsRNA having a nucleotide sequence selected to target one or more target tree pests via an RNA-interference (RNAi) mechanism; and, (c) a capsule shell containing the powdered matrix with the bound dsRNA therein. The dsRNA for a given capsule can be selected to have a specific sequence such that the dsRNA, when taken up by a target pest, is cleaved and unwound such that the ssRNA fragments can suppress or eliminate mRNAs in the target pest via an RNA interference (RNAi) mechanism. RNAi is an approach for controlling insect pests without the use of synthetic pesticides. In particular, RNAi involves gene suppression by introducing dsRNAs that undergo a "processing pathway" in the cell, that can emanate internally within a target organism cell, subsequently suppressing or eliminating the specific mRNAs in the targeted species required for normal function. It is generally sufficient for the dsRNA to be ingested by the target pest for the dsRNA to have its effect. Once injected into a tree, xylem transport within the tree can transport the dsRNA to the tree canopy and other tree tissues where the dsRNA can be consumed by the target pest to kill or control the pest. Internal tree capsule delivery and xylem transport of the dsRNA can help to preserve the activity of the dsRNA, which is typically very sensitive to UV degradation. When the dsRNA is internally delivered and transported throughout the tree, it remains largely shielded from degrading UV radiation before it is consumed from the pest. In contrast, a dsRNA that is applied foliarly to the tree canopy of other exterior environmental surface of the tree can be subject to rapid UV degradation prior to ingestion by the pest. Moreover, by internally delivering and transporting the dsRNA throughout the tree, the dsRNA is not exposed to soil microbes that can also degrade the dsRNA.

A selected dsRNA for a given capsule is generally selective to a particular target pest species of interest against which a tree is to be protected. The dsRNA sequence is selected to be complementary or otherwise based on the target pest(s) of interest. Based on the knowledge of the genome for the target pest, which the skilled person can use routine skill to determine, a suitable dsRNA sequence that is selective for that target pest can be selected. Such genomic information is available in various public databases for many pests of interest. In other cases, conventional sequencing techniques can be used to obtain genomic information of other pests not already cataloged in public databases. The dsRNA for agricultural-based target pests (e.g., insects, arachnids, etc.) according to the disclosure are generally exempt from many toxicity-based regulations otherwise generally required for pesticides.

Silica gel can have selective nucleic acid-binding properties to dsRNA under proper conditions. For example, nucleic acids can be adsorbed to a silica gel (e.g., a silica gel matrix) in the presence of chaotropic salts (e.g., guanidine thiocyanate, guanidine isothiocyanate, etc.) and alcohols (e.g., ethanol, methanol, isopropanol, etc.). The dsRNA can be bound to the silica gel via chemical mechanisms and/or physical mechanisms. For example, the dsRNA can be chemically bonded to the silica gel via covalent bonds, hydrophobic interactions, hydrogen bonds, ionic bonds, polar and dipole-dipole interactions, and the like. Alternatively or additionally, the dsRNA can be physically bonded to the silica gel, such as by being adsorbed to the surface of the silica gel and/or adsorbed within the pores of the silica gel, for example, as a result of admixing. For example, the dsRNA can be bound to the silica gel as a result of admixing the dsRNA with the silica gel in an aqueous environment composed of buffered solution with about 15% to about 40% v/v ethanol (e.g., at least 15, 20, 25, or 30% and/or up to 25, 30, 35, or 40%, such as about 36% v/v) or other similar alcohol (e.g., methanol, isopropanol, etc.) and a chaotropic salt. The dsRNA and silica gel solution can be eluted in the presence of a low ionic strength hydrophilic solution. Alternatively or additionally, the gel capsule can include free dsRNA that is not bound, either physically or chemically, to the silica gel. In such cases, the free dsRNA is simply present in admixture with the silica gel. The free dsRNA similarly has a nucleotide sequence selected to target one or more target tree pests via an RNA-interference (RNAi) mechanism. The free dsRNA suitably can have the same sequence as that of the bound dsRNA and/or have a sequence targeting the same pest as the bound dsRNA. In some embodiments, the free dsRNA and the bound dsRNA can have different sequences and/or target different pests. Advantageously, a mixture of free- and bound-dsRNA can contribute to a sustained and controlled release of the dsRNA from the gel capsule over time, where the free dsRNA is released and transported throughout the tree more quickly, with the bound dsRNA having a more delayed and controlled release from the capsule.

A silica gel material is a particularly good substrate for dsRNA binding and release, because the dsRNA can be released or eluted from the capsule within the tree by a low-ionic strength hydrophilic solution, similar to that described above. Typically, the water and/or aqueous fluids that are naturally present in the tree are sufficient for release of the dsRNA from the gel capsule via the xylem transport mechanism. In various refinements, and as illustrated in the working examples, the capsule can include non-volatile materials, such as salts or other buffer components, when forming the capsule to bind the dsRNA to the silica gel, for example by including such other components in a liquid composition containing the dsRNA, whereupon both of the dsRNA and other components are adsorbed, or otherwise bound, to the surface and/or the pores of the silica gel. Such salts and other buffer components can remain in the gel capsule when injected (e.g., to a tree trunk), and can assist in the release of the dsRNA when contacted with water (e.g., xylem-transport water) or other aqueous fluid to initiate the xylem-transport mechanism.

Various refinements of the disclosed gel capsules are possible.

In refinements, the dsRNA targets one or more tree pests selected from the group consisting of two-spotted spider mite, (*Tetranychus urticae*), codling moth (*Cydia pomonella* (L.)), obliquebanded leafroller (*Choristoneura rosaceana* (Harris)), and brown marmorated stink bug (*Halyomorpha halys* (Stål)). More generally, the dsRNA can be selected to target a particular pest species such as within the general classes of insect, arachnids, etc. For example, a target insect pest species can be within the Lepidoptera order (e.g., a moth or butterfly species), the Hemiptera order (e.g., a stink bug species), the Diptera order (e.g., a fly or fruit fly species), the Homoptera order (e.g., aphids, psyllids, leafhoppers, etc.), the Coleoptera order (e.g., beetle species such as weevils and tree boring species), etc. Similarly, a target insect pest species can be a mite or spider species, etc.

In refinements, the silica gel has a pore size of about 4 nm to about 8 nm, for example, at least about 4, 5, 6, or 7 nm and/or up to 5, 6, 7, or 8 nm. Suitable pore sizes for the silica gel or silica gel matrix can range from about 4 nm (40 Å) to about 8 nm (80 Å), such as 6 nm (60 Å). Examples of suitable, commercially available, silica gel include, but are not limited to, DAVISIL Grade 635, which has a pore size of about 60 Å.

In refinements, the silica gel has an average particle sizes of about 20 μm to about 500 μm, for example about 100 μm to about 250 μm. The particle size of the silica gel is not particularly limited and can generally be in the range of 20 μm to about 500 μm. A particularly suitable range is 100 μm to 250 μm (or a 60-100 mesh fraction based on a powder sieving, etc.). More generally, the silica gel can have an average particle size of at least about 20, 30, 50, 70, 100, or 150 μm and/or up to 70, 100, 150, 200, 250, 350, or 500 μm. The foregoing ranges can represent a number-, weight-, surface area-, or volume-based average particle size, or span of a particle size distribution (e.g., d10 to d90 span).

In refinements, the ratio of the dsRNA to the powdered matrix (e.g., comprising silica gel) is in a range of about 1:200 to about 1:50, for example at least about 1:200, 1:150, 1:100, 1:90, or 1:80 and/or up to about 1:100, 1:90, 1:80, 1:70, 1:60, or 1:50. Generally, the ratio is provided as a weight ratio, but in some cases it can also be provided as, for example, a volume ratio.

In refinements, the gel capsule comprises from about 0.10 g to about 0.50 g of the powdered matrix (e.g., with the dsRNA bound thereto), for example at least about 0.10, 0.15, 0.20, 0.25, 0.30 or 0.35 g and/or up to about 0.25, 0.30, 0.35, 0.30, 0.45, or 0.50 g of the powdered matrix. In some refinements, the gel capsule comprises about 0.25 g of the powdered matrix. Alternatively or independently, the gel capsule contents can be at least about 80, 85, 90, 95, 98, or 99 wt. % and/or up to about 90, 95, 98, 99, 99.5, 99.9 wt. % silica gel powdered matrix.

In refinements, the capsule shell comprises a gelatin material. Any of a variety of conventional capsule materials can be used to contain the powdered matrix and dsRNA, for example those intended for delayed release in various pharmaceutical, nutraceutical, cosmetic, and/or consumer product applications. Examples of suitable capsule materials include gelatin (e.g., or other animal-protein based materials), a polysaccharide (e.g., a plant polysaccharide based on cellulose, starch, or otherwise), or a water-soluble polymer (e.g., PVOH). Suitably, the capsule has a wall thickness sufficiently large to provide a rigid shell to facilitate injection within a tree. The capsule shell thickness can be adjusted further to adjust release time of its contents within the tree (e.g., increased or decreased wall thickness to respectively increase or decrease release time). Examples of suitable, commercially available capsule shells include, but are not limited to, those provided by HERBAFFAIR, such as those having a size of 000, 00, 0, 1, 2, 3, or 4. For example, a size 000 can contain approximately 800-1600 mg of material, a size of 0 can contain approximately 400-800 mg of material, and a size 4 can hold approximately 120-240 mg of material. In some cases, the capsule can be a size 0 and contain approximately 0.25 g (250 mg) of the powdered refinements (e.g., with the dsRNA bound thereto).

In another aspect, the disclosure relates to a method for delivering a dsRNA plant protection material to a tree, the method comprising inserting the gel capsule of the disclosure into an interior trunk region of a live tree.

Various refinements of the disclosed method for delivering a dsRNA plant protection material to a tree are possible.

In refinements, the method comprises inserting the gel capsules at height ranging from about 0.1 m to about 1 m above ground, for example at least about 0.1, 0.2, 0.25, 0.3, 0.4, 0.5, 0.6, or 0.7 m and/or up to 0.4, 0.5, 0.6, 0.7, 0.75, 0.8, 0.9, or 1.0 m above ground.

In refinements, the method comprises inserting a plurality of the gel capsules distributed circumferentially around the tree trunk. For example, at least 2, 3, 4, 5, 6, or 7 and/or up to 5, 6, 7, 8, 9, or 10 gel capsules can be inserted into the tree trunk. The plurality of gel capsules can be distributed evenly around the circumference of the tree trunk, such that the distance between each of the plurality of capsules is the same. Alternatively, or additionally, the capsules can be arranged in clusters of capsules (e.g., at least 2 3, or 4 and/or up 3, 4, or 5 capsules), and the clusters of capsules can be distributed evenly around the circumference of the tree trunk, such that the distance between each of the clusters is the same. The plurality of capsules (or clusters thereof) can be arranged at the same height (e.g., above ground), or at various heights.

In refinements, the tree is a fruit tree selected from the group consisting of apple trees, cherry trees, grapefruit trees, lemon trees, nectarine trees, orange trees, peach trees, pear trees, plum trees, and pomegranate trees.

In another aspect, the disclosure relates to a method of preparing the gel capsule as described herein, the method comprising: contacting (i) a solution comprising the dsRNA and a buffer with (ii) the powdered matrix, thereby binding the dsRNA to the powdered matrix; and encapsulating the powdered matrix with the bound dsRNA therein in the capsule shell. The contacting step can be performed, for example, in a column packed with silica gel, where the dsRNA and buffer solution is eluted through the column to bind the dsRNA to the silica gel. After binding the dsRNA to the silica gel, the silica gel with the bound dsRNA is suitably dried before encapsulating the powder in the capsule, for example including a centrifugation step prior to drying. For example, in some refinements, 10 mg of dsRNA in 6 mL of RNAse-free water (e.g., 1.7 mg/mL dsRNA) can be added to 22.5 mL of a commercial buffer (e.g., RLT from QIAGEN), followed by the addition of 16.5 mL of 100% ethanol, and eluted from a suitable column to provide the powdered matrix with dsRNA bound thereto.

In refinements, the buffer comprises a chaotropic salt. In refinements, the chaotropic salt is guanidine thiocyanate, guanidine isothiocyanate, or a mixture thereof. A suitable example of a commercial buffer including a chaotropic salt is RLT, as described above, which contains a high concentration of guanidine isothiocyanate. When this buffer is combined with an alcohol, such as ethanol, methanol, or isopropanol, the buffer helps support the binding of the dsRNA to the powdered matrix (e.g., comprising silica gel). In refinements, the buffer comprises ethanol, isopropanol, or a mixture thereof.

In refinements, the method further includes priming a column containing the powdered matrix with a priming solution prior to contacting the solution comprising the dsRNA and the buffer with the powdered matrix. The priming solution can be the same or different than the solution comprising the dsRNA and the buffer used to prepare the gel capsule (e.g., used to bind the dsRNA to the silica gel of the powdered matrix). In some refinements, the priming solution comprises a chaotropic salt (e.g., which can be the same or different from the chaotropic salt of the buffer solution) and an alcohol (e.g., which can be the same or different from the alcohol in the buffer solution), such as ethanol. In refinements, the ratio of the chaotropic salt to the alcohol (e.g., ethanol) in the priming solution is about 1:1.

While the disclosed gel capsules and methods are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein:

FIG. 10 illustrates ddPCR quantification data from leaf samples at 12 days after treatment (DAT).

DETAILED DESCRIPTION

Figure 1A:
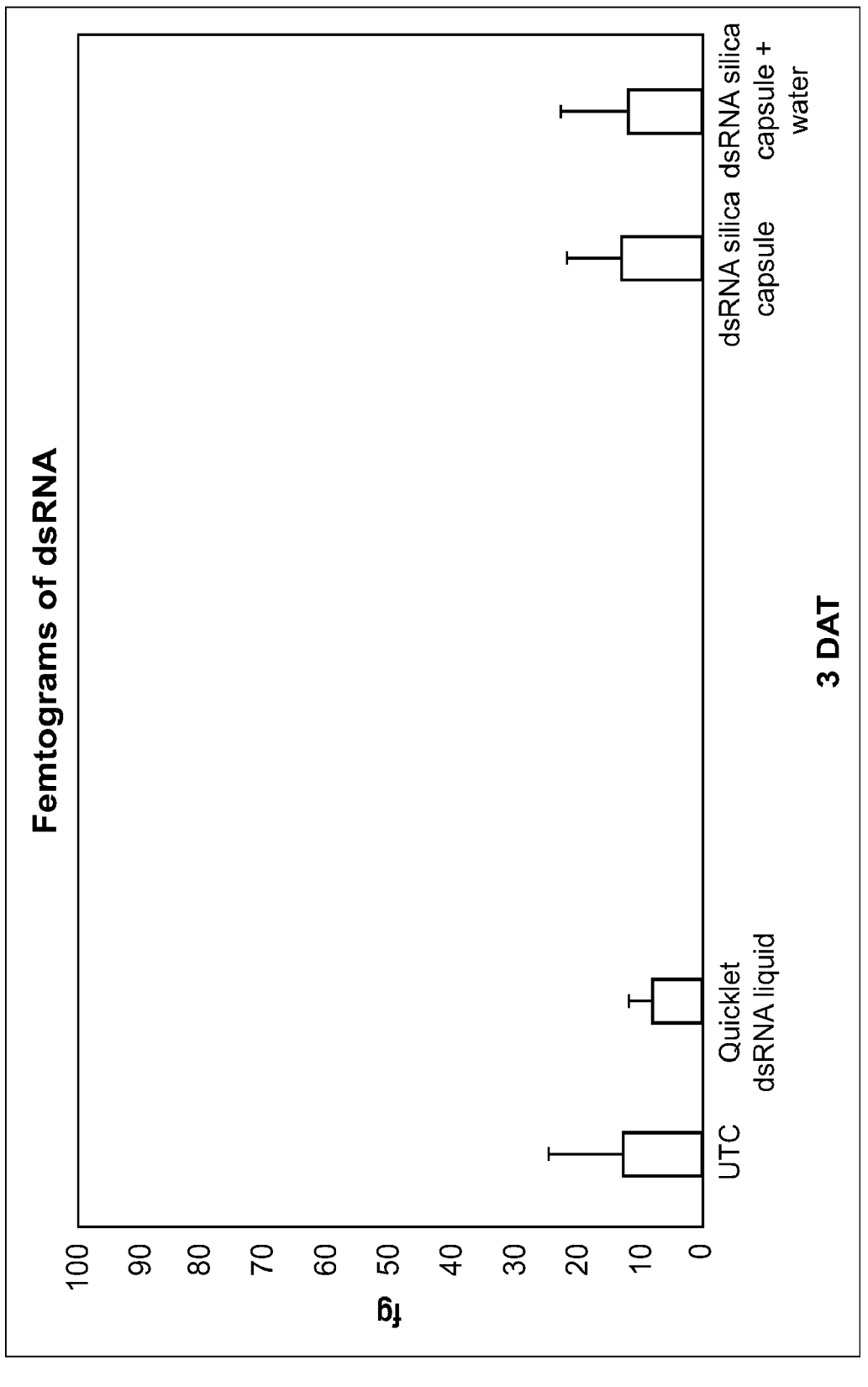
FIG. 1A illustrates ddPCR quantification data from leaf samples at 3 days after treatment (DAT).

The disclosure relates to a slow-release biodegradable gel capsule that can be used for trunk injection delivery of one or more dsRNA plant protection materials to protect woody plants (e.g., trees and fruit trees in particular) against pests. The gel capsule generally includes a powdered matrix comprising silica gel, dsRNA (double-stranded RNA) bound to the powdered matrix, the dsRNA having a nucleotide sequence selected to target one or more target tree pests via an RNA-interference (RNAi) mechanism, and a capsule shell containing the powdered matrix with the bound dsRNA therein. After injection into the tree trunk, the gel capsule provides a uniform, relatively consistent dose of active ingredient (e.g., plant protection materials, pesticide, dsRNA, or otherwise) to all parts of the tree throughout the growing season, thus reducing waste of material and cost. The biodegradable nature of the gel capsule also enhances the healing of the tree after injection.

Gel Capsule

A gel capsule according to the disclosure includes (a) a powdered matrix including silica gel; (b) dsRNA (double-stranded RNA) bound to the powdered matrix; and, (c) a capsule shell containing the powdered matrix with the bound dsRNA therein. The dsRNA has a nucleotide sequence selected to target one or more target tree pests via an RNA-interference (RNAi) mechanism.

In embodiments, the gel capsule contains from about 0.10 g to about 0.50 g of the powdered matrix, for example representing a combined amount of silica gel and dsRNA. In various embodiments, the gel capsule can contain at least about 0.10, 0.15, 0.20, 0.25, 0.30 or 0.35 g and/or up to about 0.25, 0.30, 0.35, 0.30, 0.45, or 0.50 g of the powdered matrix. In some embodiments, the gel capsule contains about 0.25 g of the powdered matrix. Alternatively or independently, the gel capsule contents can be at least about 80, 85, 90, 95, 98, or 99 wt. % and/or up to about 90, 95, 98, 99, 99.5, 99.9 wt. % silica gel powdered matrix. Alternatively or independently, the gel capsule contents can include about 0.1 mg to 50 mg, 0.2 mg to 20 mg, or 0.5 mg to 10 mg of dsRNA active ingredient, for example including only bound dsRNA, bound and free dsRNA, and/or single or multiple types of dsRNA, for example to target single or multiple pests via single or multiple RNAi pathways. In various embodiments, the gel capsule can contain at least about 0.1, 0.2, 0.3, 0.5, 0.7, 1, 2, 3, 5, 7, or 10 mg and/or up to 0.4, 0.8, 1.2, 1.5, 2, 3, 4, 6, 8, 10, 15, 20, 30, 40, or 50 mg of dsRNA active ingredient(s).

In embodiments, the ratio of the dsRNA to the powdered matrix (e.g., containing primarily silica gel) is in a range of about 1:200 to about 1:50, for example at least about 1:200, 1:150, 1:100, 1:90, or 1:80 and/or up to about 1:100, 1:90, 1:80, 1:70, 1:60, or 1:50. The foregoing ratios can alternatively represent the ratio of dsRNA to silica gel. Generally, the ratio is provided as a weight ratio, but in some cases it can also be provided as, for example, a volume ratio.

dsRNA Plant Protection Materials

The gel capsules of the disclosure include one or more dsRNA plant protection materials for delivery to internal tree tissue. The dsRNA for a given gel capsule advantageously can be selected to have a specific sequence to target a specific pest. For example, when the dsRNA is taken up taken up by a target pest, the dsRNA is cleaved and unwound to form ssRNA fragments, which can bind to, suppress, and/or eliminate mRNAs in the target pest via an RNAi mechanism. As such, in an aspect the disclosed gel capsules provide an approach for controlling pests without the use of synthetic pesticides.

Moreover, the disclosed gel capsules advantageously provide internal delivery of the dsRNA plant protection materials to tree tissue. Internal tree capsule delivery and xylem transport of the dsRNA can help to preserve the activity of the dsRNA, which is typically very sensitive to UV degradation. When the dsRNA is internally delivered and transported throughout the tree, it remains largely shielded from degrading UV radiation before it is consumed by the pest. In contrast, a dsRNA that is applied foliarly to the tree canopy or other exterior environmental surface of the tree can be subject to rapid UV degradation prior to ingestion by the pest. Moreover, by internally delivering and transporting the dsRNA throughout the tree, the dsRNA is not exposed to soil microbes that can also degrade the dsRNA.

RNAi involves gene suppression by introducing dsRNAs that undergo a "processing pathway" in the cell, that can emanate internally within a target organism cell, subsequently suppressing or eliminating the specific mRNAs in the targeted species required for normal function. It is generally sufficient for the dsRNA to be ingested by the target pest for the dsRNA to have its effect. Once injected into a tree, xylem transport within the tree can transport the dsRNA to the tree canopy (or leaves) and other tree tissues where the dsRNA can be consumed by the target pest to kill or control the pest.

A selected dsRNA for a given capsule is generally selective to a particular target pest species of interest against which a tree is to be protected. The dsRNA sequence is selected to be complementary or otherwise based on the target pest(s) of interest. Based on the knowledge of the genome for the target pest, which the skilled person can use routine skill to determine, a suitable dsRNA sequence that is selective for that target pest can be selected. Such genomic information is available in various public databases for many pests of interest. In other cases, conventional sequencing techniques can be used to obtain genomic information of other pests not already cataloged in public databases. Likewise, conventional RNA synthesis techniques can be used to prepare dsRNA with the desired sequence to target a given pest. Accordingly, given a target pest of interest, selection and synthesis of a corresponding dsRNA to target the pest via the RNAi mechanism can be performed using information and techniques routinely available to the skilled artisan. The dsRNA for agricultural-based target pests (e.g., insects, arachnids, etc.) according to the disclosure are generally exempt from many toxicity-based regulations otherwise generally required for pesticides.

In some embodiments, the dsRNA can be selected to target a particular pest species such as within the general classes of insect, arachnids, etc. For example, a target insect pest species can be within the Lepidoptera order (e.g., a moth or butterfly species), the Hemiptera order (e.g., a stink bug species), the Diptera order (e.g., a fly or fruit fly species), the Homoptera order (e.g., aphids, psyllids, leafhoppers, etc.), the Coleoptera order (e.g., beetle species such as weevils and tree boring species), etc. Similarly, a target insect pest species can be a mite or spider species, etc. In some embodiments, the dsRNA targets one or more tree pests such as two-spotted spider mites (*Tetranychus urticae*), codling moths (*Cydia pomonella* (L.)), obliquebanded leaf rollers (*Choristoneura rosaceana* (Harris)), and brown marmorated stink bugs (*Halyomorpha halys* (Stål)).

Powdered Matrix

The disclosed gel capsules include a powdered matrix, which primarily includes silica gel. A function of the silica gel is binding the dsRNA plant protection material. For example, silica gel can have selective nucleic acid-binding properties to dsRNA under proper conditions. See, for example, U.S. Pat. No. 5,658,548, which is herein incorporated by reference. For example, nucleic acids can be adsorbed to a silica gel (e.g., a silica gel matrix) in the presence of chaotropic salts (e.g., guanidine thiocyanate, guanidine isothiocyanate, etc.) and alcohols (e.g., ethanol, methanol, isopropanol, etc.). The dsRNA can be bound to the silica gel via chemical mechanisms and/or physical mechanisms. For example, the dsRNA can be chemically bonded to the silica gel via covalent bonds, hydrophobic interactions, hydrogen bonds, ionic bonds, polar and dipole-dipole interactions, and the like. Alternatively or additionally, the dsRNA can be physically bonded to the silica gel, such as by being adsorbed to the surface of the silica gel and/or adsorbed within the pores of the silica gel, for example, as a result of admixing. For example, the dsRNA can be bound to the silica gel as a result of admixing the dsRNA with the silica gel in an aqueous environment composed of buffered solution with about 15% to about 40% v/v ethanol (e.g., at least 15, 20, 25, or 30% and/or up to 25, 30, 35, or 40%, such as about 36% v/v) or other similar alcohol (e.g., methanol, isopropanol, etc.) and a chaotropic salt. The dsRNA and silica gel solution can be eluted in the presence of a low ionic strength hydrophilic solution.

Alternatively or additionally, the gel capsule can include free dsRNA that is not bound, either physically or chemically, to the silica gel. In such cases, the free dsRNA is simply present in admixture with the silica gel. The free dsRNA similarly has a nucleotide sequence selected to target one or more target tree pests via an RNAi mechanism. The free dsRNA suitably can have the same sequence as that of the bound dsRNA and/or have a sequence targeting the same pest as the bound dsRNA. In some embodiments, the free dsRNA and the bound dsRNA can have different sequences and/or target different pests. Advantageously, a mixture of free- and bound-dsRNA can contribute to a sustained and controlled release of the dsRNA from the gel capsule over time, where the free dsRNA is released and transported throughout the tree more quickly, with the bound dsRNA having a more delayed and controlled release from the capsule.

A silica gel material is a particularly good substrate for dsRNA binding and release, because the dsRNA can be released or eluted from the capsule within the tree by a low-ionic strength hydrophilic solution, similar to that described above. Typically, the water and/or aqueous fluids (e.g., tree sap) that are naturally present in the tree are sufficient for release of the dsRNA from the gel capsule via the xylem transport mechanism. In various refinements, and as illustrated in the working examples, the capsule can include non-volatile materials, such as salts or other buffer components, when forming the capsule to bind the dsRNA to the silica gel, for example by including such other components in a liquid composition containing the dsRNA, whereupon both of the dsRNA and other components are adsorbed, or otherwise bound, to the surface and/or the pores of the silica gel. Such salts and other buffer components can remain in the gel capsule when injected (e.g., to a tree trunk), and can assist in the release of the dsRNA when contacted with water (e.g., xylem-transport water) or other aqueous fluid to initiate the xylem-transport mechanism.

By way of example, any impurities can be removed with a wash buffer containing a high concentration of ethanol (e.g., 1× Tris EDTA with 80% ethanol, (v/v)). The bound nucleic acids from the silica matrix are released, or "eluted" upon contact with a hydrophilic solution (e.g. water; low-ionic strength solutions such as a Tris EDIA buffer, saline solution, etc.). Without wishing to be bound to any particular theory, the dsRNA is "released" when the dsRNA-containing silica gel capsule, delivered by trunk injection in a tree, is bathed, immersed, or otherwise contacted by the tree's hydrophilic vascular fluids (e.g., tree sap), whereby the gel capsule first disintegrates gradually followed by the exposure of its silica content to the tree fluids leading to the elution of the dsRNA. The eluted dsRNA then travels to the vasculature of the tree in an ascending manner for deposition into the canopy or leaf tissue where it can exhibit its pesticidal effect upon ingestion by a target pest.

It is desirable that the silica gel have a porosity suitable for delivering a dsRNA plant protection material to internal tree tissue, that is, a suitable porosity for both suitably binding the dsRNA in the gel capsule and eluting the dsRNA to internal tree tissues during a desired time frame. In embodiments, the silica gel has a pore size of about 4 nm to about 8 nm, for example, at least about 4, 5, 6, or 7 nm and/or up to 5, 6, 7, or 8 nm. Suitable pore sizes for the silica gel or silica gel matrix can range from about 4 nm (40 Å) to about 8 nm (80 Å), such as 6 nm (60 Å). Examples of suitable, commercially available, silica gel include, but are not limited to, DAVISIL® Grade 635, which has a pore size of about 60 Å.

In embodiments, the silica gel has an average particle size of about 20 μm to about 500 μm, for example about 100 μm to about 250 μm. The particle size of the silica gel is not particularly limited and can generally be in the range of 20 μm to about 500 μm. A particularly suitable range is 100 μm to 250 μm (or a 60-100 mesh fraction based on a powder sieving, etc.). More generally, the silica gel can have an average particle size of at least about 20, 30, 50, 70, 100, or 150 μm and/or up to 70, 100, 150, 200, 250, 350, or 500 μm.

The foregoing ranges can represent a number-, weight-, surface area-, or volume-based average particle size, or span of a particle size distribution (e.g., d10 to d90 span).

Capsule Shell

The gel capsules of the disclosure include a capsule shell. The capsule shell provides a vehicle for storage and trunk insertion of the silica gel containing bound dsRNA. After trunk insertion capsule disintegrates gradually upon contact with aqueous or otherwise hydrophilic fluids within the tree, thereby exposing the silica gel for eventual delayed and/or timed release of the dsRNA active ingredient into the tree xylem transport system.

In embodiments, the capsule shell is formed form or otherwise contains a gelatin material. Any of a variety of conventional capsule materials can be used to contain the powdered matrix and dsRNA, for example those intended for delayed release in various pharmaceutical, neutraceutical, cosmetic, and/or consumer product applications. Examples of suitable capsule materials include gelatin (e.g., or other animal-protein based materials), a polysaccharide (e.g., a plant polysaccharide based on cellulose, starch, or otherwise), or a water-soluble polymer (e.g., polyvinyl alcohol). Suitably, the capsule has a wall thickness sufficiently large to provide a rigid shell to facilitate injection within a tree. The capsule shell thickness can be adjusted further to adjust release time of its contents within the tree, for example with an increased or decreased wall thickness to respectively increase or decrease release time. Examples of suitable, commercially available capsule shells include, but are not limited to, those provided by HERBAFFAIR, such as those having a size of 000, 00, 0, 1, 2, 3, or 4. For example, a size 000 can contain approximately 800-1600 mg of material, a size of 0 can contain approximately 400-800 mg of material, and a size 4 can hold approximately 120-240 mg of material. In some cases, the capsule can be a size 0 and contain approximately 0.25 g (250 mg) of the powdered embodiments (e.g., with the dsRNA bound thereto).

The disclosed gel capsules can have any desired shape, but it is suitably shaped based on ease of processing and a desire to have a relatively large relative surface area (e.g., surface area/volume or surface area/mass ratio). In some embodiments, the gel capsules have an elongate geometry. Typically, the capsule shell can be suitably sized to accommodate any desired amount of powdered matrix for trunk injection. In various embodiments, the capsule shell can have a generally cylindrical shape, for example with an (external) length (L) of about 5 mm to 50 mm, 8 mm to 16 mm, or 10 mm to 25 mm, and/or with an (external) diameter (D) of about 3 mm to 20 mm, 4 mm to 7 mm, or 5 mm to 10 mm. The L/D aspect ratio can be at least 1:1 or 2:1 and/or up to 3:1, 4:1, 6:1, or 8:1. The specific geometry/size can be selected to have a desired total volume in terms of amount of active (dsRNA) ingredient to be delivered and to have a desired specific surface area (area per unit volume) to control delivery rate.

Method for dsRNA Plant Protection Material Delivery

In another aspect, the disclosure relates to a method for delivering a dsRNA plant protection material to a tree, the method including inserting the gel capsule of the disclosure into an interior trunk region of a live tree.

Various embodiments of the disclosed method for delivering a dsRNA plant protection material to a tree are possible. The gel capsule according to any of its variously disclosed embodiments can be used to deliver a relatively uniform, consistent amount of its dsRNA plant protection material active component over time to tree tissue at or above the plug's point of insertion into the tree. The water-soluble and/or water-degradable nature of the gel capsule assists in dsRNA release and aqueous deliver of the dsRNA via xylem (and optionally phloem) transport.

The gel capsules are inserted into a trunk of a live tree in a suitable number and at a suitable position (e.g., a suitable height above ground) in the tree. For example, the gel capsule can be inserted into an interior region of a live tree (e.g., into the trunk, one or more branches, etc.) and then natural water and/or sap transport within the tree will release and deliver the dsRNA plant protection material from the gel capsule. Inserting the gel capsule can involve drilling a hole in the tree trunk with a diameter generally corresponding to that of the gel capsule and a desired depth, and then inserting the gel capsule into the hole. The manner of gel capsule insertion is not particularly limited, however, and any suitable mechanical means may be used (e.g., a mechanical device or tool that can insert the gel capsule with or without the use of a drill). The length of the gel capsule and its insertion depth into the trunk are generally selected to provide maximum exposure of the capsule's outer surface area to active xylem and/or phloem tissues, which are immediately under the bark of the tree. Suitable depths can be determined by the skilled artisan based on the type and size of tree for injection.

The gel capsule is generally inserted into a lower portion of the tree trunk, typically between the ground and the first set of scaffold limbs or branches above the ground. Injection at such point ensures that xylem transport of the dsRNA plant protection material will reach most or essentially all plant tissue above the insertion point, given that xylem transport of water initiates at the roots and travels upwards to the plant tissue extremities. By way of non-limiting example for various common trees of interest, the gel capsule can be inserted at a height ranging from 0.1 m to 1 m above the ground (e.g., a height of at least 0.1 or 0.2 m and/or up to 0.3, 0.5, or 1 m). In apple trees, for example, the first set of scaffold limbs occur at or above about 0.3 m, so an insertion point below 0.3 m is desirable. In embodiments, the method includes inserting the gel capsules at height ranging from about 0.1 m to about 1 m above ground, for example at least about 0.1, 0.2, 0.25, 0.3, 0.4, 0.5, 0.6, or 0.7 m and/or up to 0.4, 0.5, 0.6, 0.7, 0.75, 0.8, 0.9, or 1.0 m above ground.

For a given tree, multiple gel capsules are suitably inserted into the tree at multiple positions distributed around the tree trunk (e.g., circumferentially distributed). The total number of gel capsules for a given tree increases as the trunk diameter increases. Larger trees need more active ingredient because they have more canopy. Xylem is sectored within the tree such that multiple plugs are needed to attain an even distribution of product in the tree canopy. For example, 2, 3, 4, 5, 6, 8, 10, 12, 15, 20, or more gel capsules can be distributed around the circumference of the tree trunk at approximately even intervals (e.g., at approximately 360°/n intervals where n is the number of gel capsules inserted into the tree trunk).

In embodiments, the method includes inserting a plurality of the gel capsules distributed circumferentially around the tree trunk. For example, at least 2, 3, 4, 5, 6, or 7 and/or up to 5, 6, 7, 8, 9, or 10 gel capsules can be inserted into the tree trunk. The plurality of gel capsules can be distributed evenly around the circumference of the tree trunk, such that the distance between each of the plurality of capsules is the same. Alternatively, or additionally, the capsules can be arranged in clusters of capsules (e.g., at least 2 3, or 4 and/or up 3, 4, or 5 capsules), and the clusters of capsules can be distributed evenly around the circumference of the tree trunk, such that the distance between each of the clusters is the same. The plurality of capsules (or clusters thereof) can be arranged at the same height (e.g., above ground), or at various heights.

The types of trees that can be treated with the disclosed gel capsules are not particularly limited and can be trees in a cultivated area (e.g., orchard), a nursery, or a wild area (e.g., forest), for example. Suitable types of trees include fruit trees, ornamental trees, forest trees, etc. Examples of specific fruit trees of interest include apple trees, cherry trees, grapefruit trees, lemon trees, lime trees, nectarine trees, orange trees, peach trees, pear trees, plum trees, and pomegranate trees. In embodiments, the tree is a fruit tree such as one or more of apple trees, cherry trees, grapefruit trees, lemon trees, nectarine trees, orange trees, peach trees, pear trees, plum trees, and pomegranate trees.

Methods of Preparing Gel Capsules

In another aspect, the disclosure relates to a method of preparing the gel capsule as described herein. The method generally includes contacting (i) a solution comprising the dsRNA and a buffer with (ii) the powdered matrix, thereby binding the dsRNA to the powdered matrix; and encapsulating the powdered matrix with the bound dsRNA therein in the capsule shell. The contacting step can be performed, for example, in a column packed with silica gel, where the dsRNA and buffer solution is eluted through the column to bind the dsRNA to the silica gel. After binding the dsRNA to the silica gel, the silica gel with the bound dsRNA is suitably dried before encapsulating the powder in the capsule, for example including a centrifugation step prior to drying. For example, in some embodiments, 10 mg of dsRNA in 6 mL of RNAse-free water (e.g., 1.7 mg/mL dsRNA) can be added to 22.5 mL of a commercial buffer (e.g., RLT from QIAGEN), followed by the addition of 16.5 mL of 100% ethanol, and eluted from a suitable column to provide the powdered matrix with dsRNA bound thereto.

In embodiments, the buffer includes a chaotropic salt. In embodiments, the chaotropic salt is guanidine thiocyanate, guanidine isothiocyanate, or a mixture thereof. A suitable example of a commercial buffer including a chaotropic salt is RLT, as described above, which contains a high concentration of guanidine isothiocyanate. When this buffer is combined with an alcohol, such as ethanol, methanol, or isopropanol, the buffer helps support the binding of the dsRNA to the powdered matrix (e.g., including silica gel). In embodiments, the buffer includes one or more of ethanol, isopropanol, or a mixture thereof.

In embodiments, the method further includes priming a column containing the powdered matrix with a priming solution prior to contacting the solution comprising the dsRNA and the buffer with the powdered matrix. The priming solution can be the same or different than the solution comprising the dsRNA and the buffer used to prepare the gel capsule (e.g., used to bind the dsRNA to the silica gel of the powdered matrix). In some embodiments, the priming solution comprises a chaotropic salt (e.g., which can be the same or different from the chaotropic salt of the buffer solution) and an alcohol (e.g., which can be the same or different from the alcohol in the buffer solution), such as ethanol. In embodiments, the ratio of the chaotropic salt to the alcohol (e.g., ethanol) in the priming solution is about 1:1.

While the disclosed gel capsules and methods are susceptible of embodiments in various forms, specific embodiments of the disclosure are illustrated (and will hereafter be described) with the understanding that the disclosure is intended to be illustrative, and is not intended to limit the claims to the specific embodiments descried and illustrated herein.

EXAMPLES

The following examples illustrate gel capsules, related methods for forming the gel capsules, and related methods for delivering a dsRNA plant protection material disclosed herein, but are not intended to be limiting.

The following abbreviations are used in the Examples: AI refers to active ingredient; ddPCR refers to droplet digital polymerase chain reaction; RLT refers to a lysis buffer; RPE refers to a commercial washing buffer available from Qiagen (e.g., for removing salts); DFH refers to trunk diameter at one foot (about 30 cm) above ground; DAT refers to days after treatment; UTC refers to untreated control; and rcf refers to relative centrifugal force.

dsRNA Precipitation Methods: (dsRNA Concentrations of at Least 1 mg/mL)

Ethanol precipitation. To a dsRNA solution was added 0.1 volume of 3 M sodium acetate (pH 5.5). Precipitation was induced by adding 2.5 volumes of 100% EtOH. Alternatively, 5 M sodium chloride was added to the dsRNA solution to a final concentration of 0.3 M sodium chloride before precipitation with EtOH. The precipitated mixture was incubated on ice for at least 1 hour, or at least 20 minutes at −80° C. The precipitated dsRNA was pelleted by centrifugation (e.g., 4,000 rpm for 5-10 minutes) and the supernatant decanted.

Isopropanol precipitation. To a dsRNA solution was added 0.5 volume of 7.5 M ammonium acetate with mixing (e.g., vortex). Precipitation was induced by adding 1 volume of isopropanol followed by incubating on ice for at least 1 hour, or at least 20 minutes at −80° C. The precipitated dsRNA was pelleted by centrifugation (e.g., 4,000 rpm for 5-10 minutes) and the supernatant decanted. The pellet was rinsed with cold 70% EtOH.

Non-Alcohol precipitation technique. Lithium chloride precipitation can be used for dsRNA solutions that may contain carbohydrate, protein or DNA. To the dsRNA solution was added 0.5 volume of 7.5 M lithium chloride followed by incubating at −20° C. for at least 30 min. The dsRNA was pelleted by centrifugation (e.g., 4,000 rpm for 5-10 minutes) and the supernatant decanted. The pellet rinsed with cold 70% EtOH.

Production of Silica Gel Capsules Containing Bound dsRNA

One gram of silica gel (e.g., high-purity grade (DAVISIL Grade 635) pore size 60 Å, (60-100 mesh) (Sigma Aldrich, Milwaukee, WI) was deposited evenly on the bottom surface of a commercial maxicolumn (QIAGEN RNEASY MAXI KIT, Qiagen, Germantown, MD) with the original membrane removed and instead, was pre-lined with three layers of sterilized cotton filter paper (#41, cut to size) (Whatman, Vernon Hills, IL). Ten mg of dsRNA in 6 mL of RNAse-free water was added to 22.5 mL of commercial buffer RLT (Qiagen) followed by the addition of 16.5 mL of 100% ethanol to the mixture. Buffer RLT is described as containing a high concentration of guanidine isothiocyanate (a chaotropic salt solution) when combined with an appropriate concentration of ethanol, supports the binding of RNA to the silica matrix.

The silica gel in the column was first subjected to a priming wash with 2 mL of buffer RLT with 70% ethanol (a 1:1 mixture) and centrifuged at 3,000 rcf for 2 min. A 50 mL conical tube with cap was used as a flow-through collection tube with the flow-through discarded after each centrifugation step. The dsRNA-binding buffer mixture was then applied to the column 15 mL at a time and centrifuged at 3,000 rcf for 3 min each round of binding (required 3 rounds to run the total volume of buffer). After the completion of the dsRNA-binding step, a wash step was performed twice with the addition of 10 mL of buffer RPE (Qiagen) to the column and centrifugation at 3,000 rcf for 2 min for each round of wash. After the wash steps, a drying centrifugation step at 4,000 rcf for 4 min was performed. The silica with bound dsRNA was air-dried in the uncapped column under a chemical fume hood for another 10-15 min. After drying, the silica gel particles were removed from the column, partitioned and packaged in gel capsules appropriately. Expected amount of bound dsRNA per 1 gram of silica gel is 7-8 mg.

Gel capsules (size 0, HERBAFFAIR, Palatine, IL) were filled with dsRNA-bound silica gel by carefully pouring through a narrow plastic funnel into each capsule. The capsules were sized to hold 0.33 g raw silica gel each, but the post-binding silica volume was greater such that the 1 g batch filled 4 capsules (i.e., about 0.25 g powdered matrix with bound dsRNA in each capsule). dsRNA-bound silica-filled capsules were then stored at 4° C. refrigeration in a sealed plastic bag with dessicant pouches to maintain integrity.

Field Studies: Field studies were conducted to determine if dsRNA can be delivered to apple tree canopy foliage, comparing controlled-release gel capsules according to the disclosure, with and without the addition of water, to a liquid formulation using a commercial ARBORJET QUICKJET trunk injection tool. The dsRNA and dosage parameters are provided in Table 1. Treatment injections were made to semi-dwarf Yellow Delicious apple trees (6 inch or about 15 cm DFH) on 18 May (tight cluster/pink stage of apple phenology), with four injection ports per trunk and approximately one foot (or about 30 cm) above the ground, replicated four times.

Figure 1B:
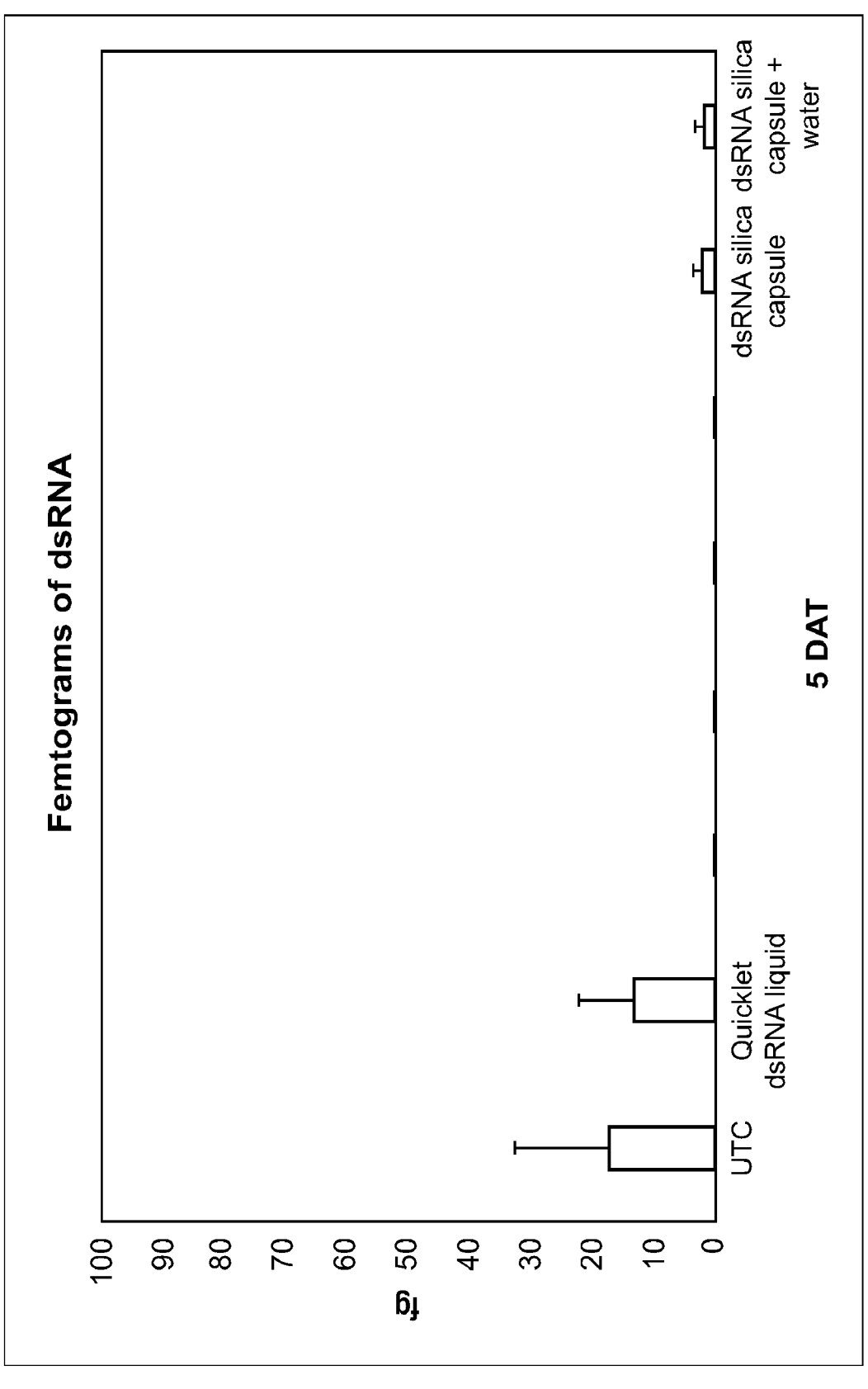
FIG. 1B illustrates ddPCR quantification data from leaf samples at 5 days after treatment (DAT).
Figure 1C:
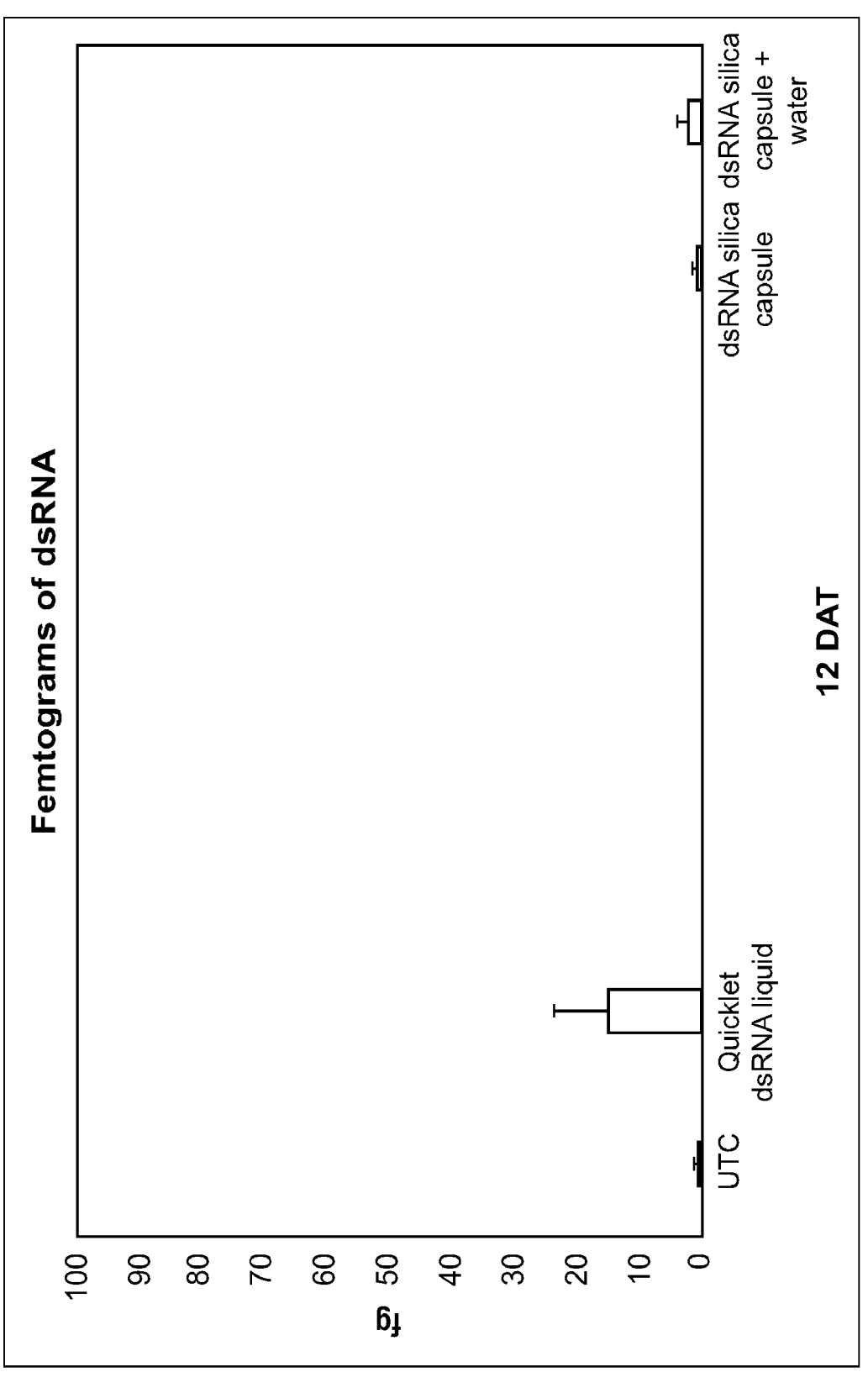
FIG. 1D illustrates ddPCR quantification data from leaf samples at 26 days after treatment (DAT).
FIG. 1E illustrates ddPCR quantification data from leaf samples at 54 days after treatment (DAT).
FIG. 1F illustrates ddPCR quantification data from leaf samples at 82 days after treatment (DAT).
Figure 1D:
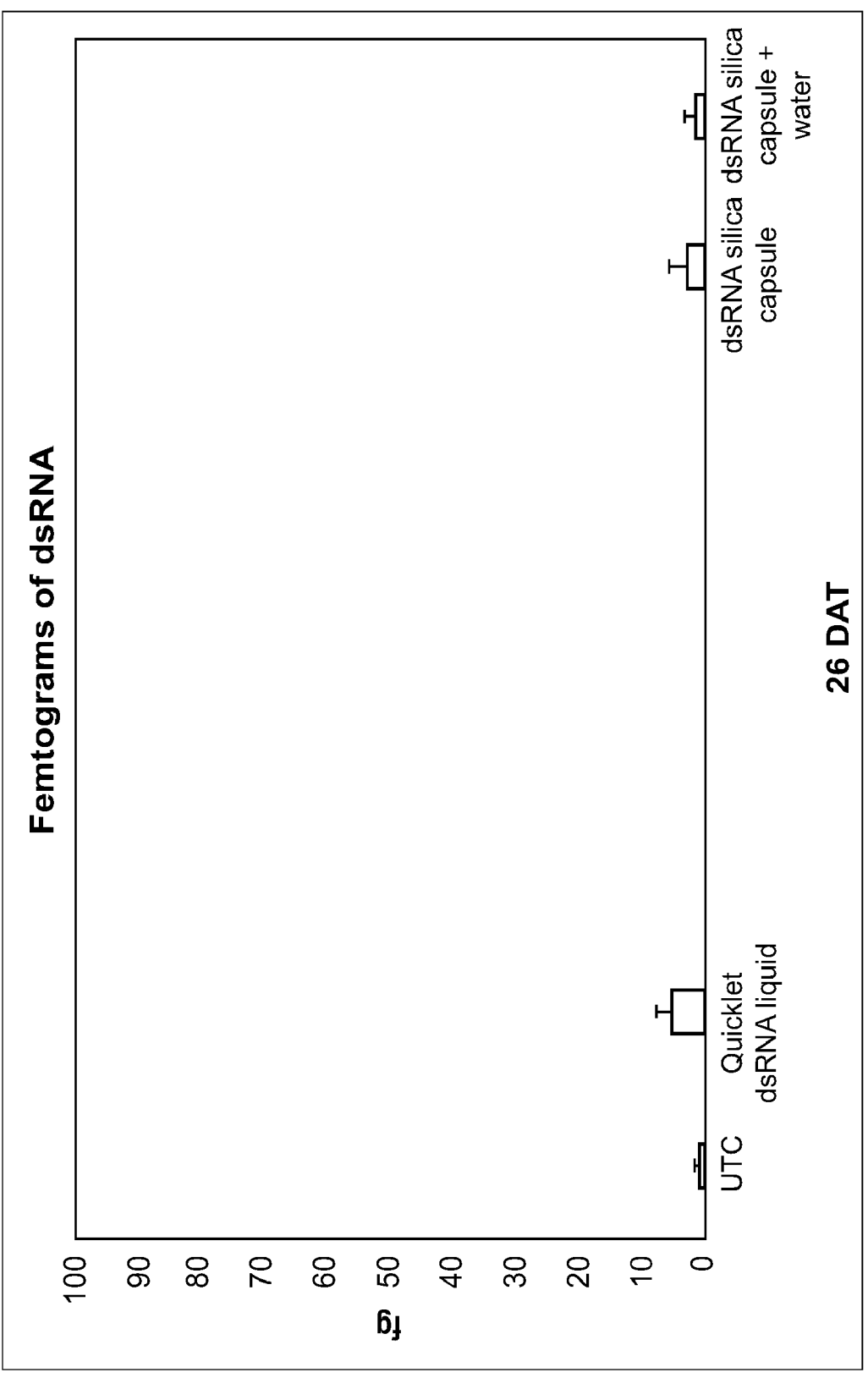
Figure 1E:
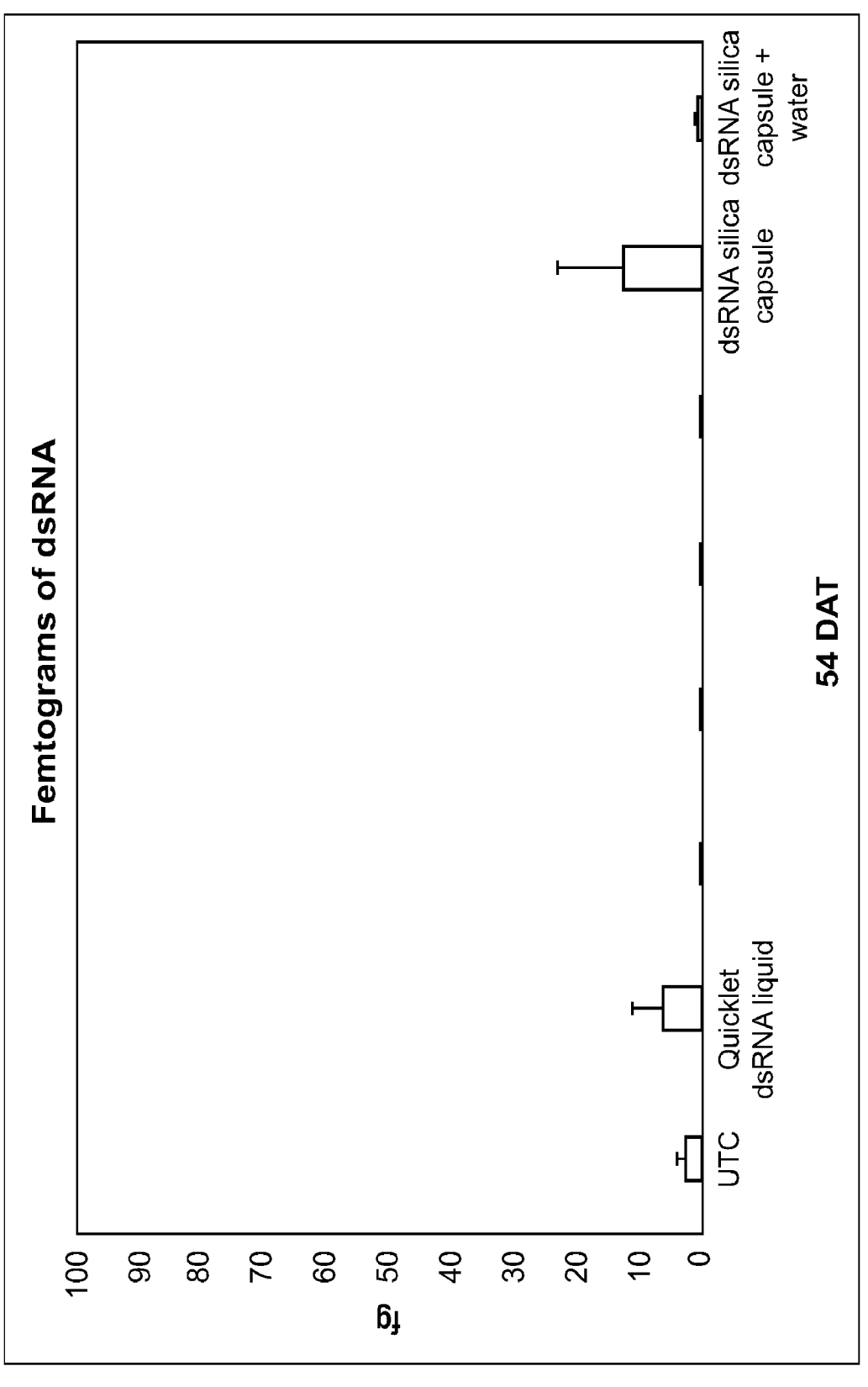
Figure 1F:
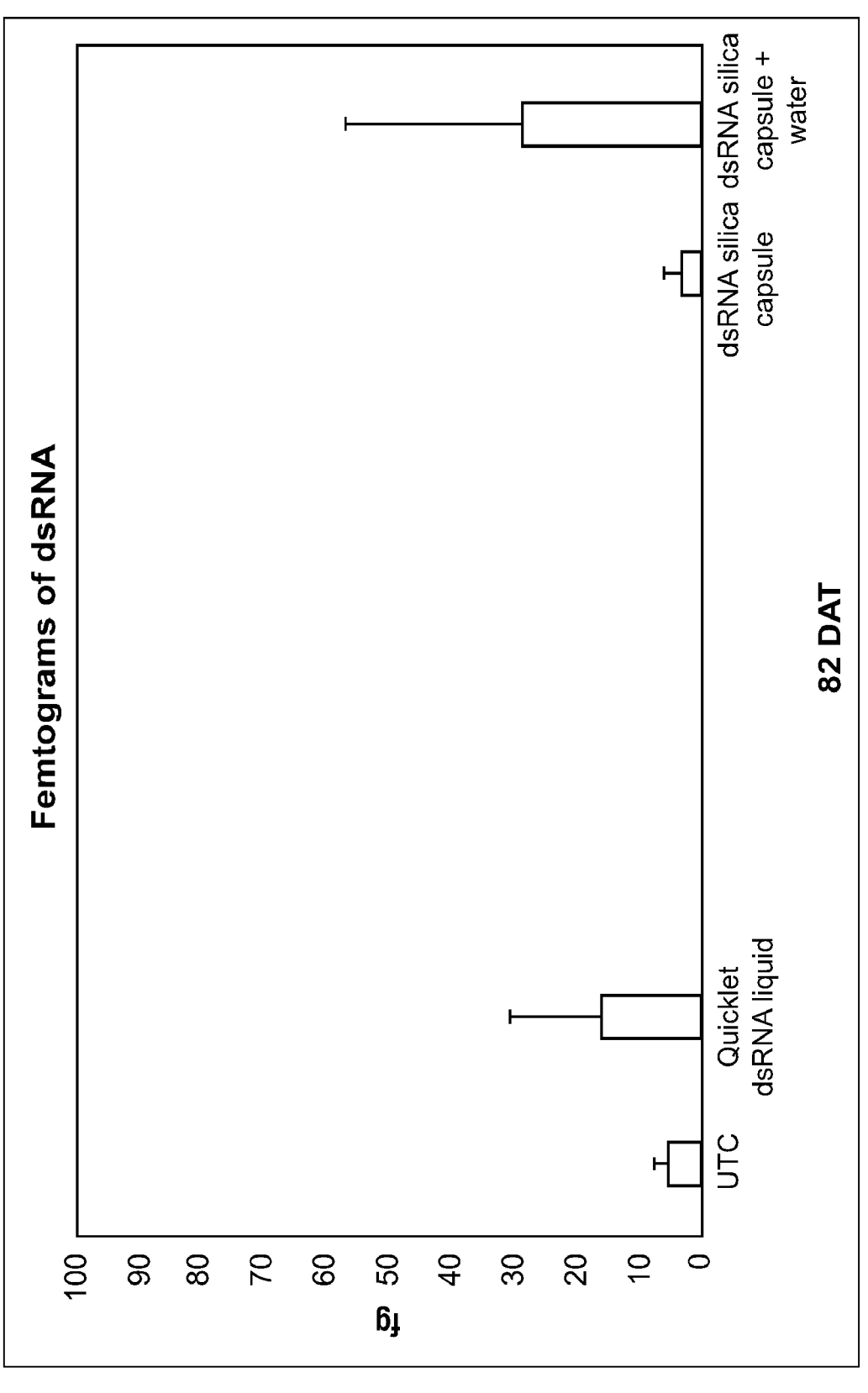

Field samples were taken from injected trees for each treatment by collecting leaves 3, 5, 12, 26, 54, 82 days after treatment (DAT). The leaf samples were a minimum of 40 leaves (±20 g) of tissue collected from the N, S, E, W sides of the tree, high/low, and delivered in a cooler on the same day to the laboratory. Leaf samples were placed in a mortar (mortar and pestle that has been pre-chilled in −80° C. freezer), and leaves were ground to a fine powder with pestle after submersing in liquid nitrogen. Label sample vials and autoclaved 2 mL sample vials were held in −80° C. freezer until filled with 1-2 g of leaf powder, two sub-samples per treatment and replicate. Sample vials were stored at −80° C. until shipping to an RNA analysis laboratory in dry ice for quantification. Recovery data was recorded and graphically displayed to compare temporal delivery patterns across treatments (FIGS. 1A-1F).

TABLE 1

| | Field Trial Treatment | | |
| --- | --- | --- | --- |
| Sample | Capsules (per tree) | dsRNA (mg/tree) | Application Method |
| UTC | — | — | — |
| QUICKJET dsRNA liquid | — | 10 | in 400 mL water per tree |
| dsRNA silica capsule[1] | 4 | 8 | 0.64 cm diameter drill |
| dsRNA silica capsule[1] | 4 | 8 | 0.64 diameter drill + 100 mL water per port |

[1]Each dsRNA silica capsule (denoted as 03-18) contained about 0.3 g silica gel and about 2 mg dsRNA bound thereto.

Results: The gel capsules delivered dsRNA to the apple canopy during one or more sampling periods, with the highest concentrations detected at the 3 DAT (May 21) and 82 DAT (August 8) dates. The decline in dsRNA concentrations from 5 DAT to 54 DAT reflect dramatic growth dilution effects during the growing season, since apple trees add approximately 5 fold leaf tissue to the canopy during this period. Thus, even though dsRNA continued to be delivered to the canopy, accumulation was not seen until terminal growth ceases in late July with high concentrations being quantified again at 82 DAT. Peak dsRNA concentrations reached mean values of nearly 100 femtograms in May and August. By normalizing these data based on the ddPCR procedures used in quantification, the concentration of dsRNA was estimated to be as high as 135 picograms per 1 gram of leaf tissue.

Because other modifications and changes varied to fit particular operating requirements and environments will be apparent to those skilled in the art, the disclosure is not considered limited to the example(s) chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In the case of conflict, the present description, including definitions, will control.

Throughout the specification, where the compounds, compositions, methods, and/or processes are described as including components, steps, or materials, it is contemplated that the compounds, compositions, methods, and/or processes can also comprise, consist essentially of, or consist of any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for delivering a dsRNA plant protection material to a tree, the method comprising:
inserting a gel capsule into an interior trunk region of a live tree, the gel capsule comprising: (a) a powdered matrix comprising silica gel; (b) dsRNA (double-stranded RNA) bound to the powdered matrix, the dsRNA having a nucleotide sequence selected to target one or more target tree pests via an RNA-interference (RNAi) mechanism; and, (c) a capsule shell containing the powdered matrix with the bound dsRNA therein.

2. The method of claim 1, comprising inserting the gel capsule at a height ranging from about 0.1 m to about 1 m above ground.

3. The method of claim 1, comprising inserting a plurality of the gel capsules distributed circumferentially around the tree trunk.

4. The method of claim 1, wherein the tree is a fruit tree selected from the group consisting of apple trees, cherry trees, grapefruit trees, lemon trees, nectarine trees, orange trees, peach trees, pear trees, plum trees, and pomegranate trees.

5. The method of claim 1, wherein:
the silica gel has a pore size of about 4 nm to about 8 nm;
the silica gel has an average particle size of about 20 μm to about 500 μm;
the ratio of the dsRNA to the powdered matrix is in a range of about 1:200 to about 1:50; and
the gel capsule comprises from about 0.10 g to about 0.50 g of the powdered matrix.

6. The method of claim 5, wherein the capsule shell comprises a gelatin material.

7. The method of claim 5, wherein:
the silica gel is at least 80 wt. % of the gel capsule contents; and
the method comprises inserting at least 4 gel capsules distributed circumferentially around the tree trunk, each at a height ranging from about 0.1 m to about 1 m above ground, and each at an insertion point providing exposure to xylem tissue in the tree such that the dsRNA plant protection material reaches plant tissue above the insertion point via xylem transport; wherein:
the tree is a fruit tree selected from the group consisting of apple trees, cherry trees, grapefruit trees, lemon trees, nectarine trees, orange trees, peach trees, pear trees, plum trees, and pomegranate trees; and
the dsRNA targets one or more tree pests selected from the group consisting of two-spotted spider mite, (Tetranychus urticae), codling moth (Cydia pomonella (L.)), obliquebanded leafroller (Choristoneura rosaceana (Harris)), and brown marmorated stink bug (Halyomorpha halys (Stål)).

8. The method of claim 7, wherein the capsule shell comprises a gelatin material.

9. The method of claim 7, wherein the capsule shell comprises a material selected from the group consisting of a polysaccharide and a water-soluble polymer.

10. The method of claim 1, wherein the capsule shell comprises a material selected from the group consisting of a polysaccharide and a water-soluble polymer.

11. The method of claim 1, wherein the silica gel is at least 80 wt. % of the gel capsule contents.

12. The method of claim 11, comprising:
inserting at least 4 gel capsules distributed circumferentially around the tree trunk, each at a height ranging from about 0.1 m to about 1 m above ground, and each at an insertion point providing exposure to xylem tissue in the tree such that the dsRNA plant protection material reaches plant tissue above the insertion point via xylem transport;
wherein:
the tree is a fruit tree selected from the group consisting of apple trees, cherry trees, grapefruit trees, lemon trees, nectarine trees, orange trees, peach trees, pear trees, plum trees, and pomegranate trees; and
the dsRNA targets one or more tree pests selected from the group consisting of two-spotted spider mite, (Tetranychus urticae), codling moth (Cydia pomonella (L.)), obliquebanded leafroller (Choristoneura rosaceana (Harris)), and brown marmorated stink bug (Halyomorpha halys (Stål)).

13. The method of claim 1, wherein the dsRNA targets one or more tree pests selected from the group consisting of two-spotted spider mite, (Tetranychus urticae), codling moth (Cydia pomonella (L.)), obliquebanded leafroller (Choristoneura rosaceana (Harris)), and brown marmorated stink bug (Halyomorpha halys (Stål)).

14. The method of claim 1, wherein the silica gel has a pore size of about 4 nm to about 8 nm.

15. The method of claim 1, wherein the silica gel has an average particle size of about 20 μm to about 500 μm.

16. The method of claim 1, wherein the ratio of the dsRNA to the powdered matrix is in a range of about 1:200 to about 1:50.

17. The method of claim 1, wherein the gel capsule comprises from about 0.10 g to about 0.50 g of the powdered matrix.

18. The method of claim 17, wherein the gel capsule comprises about 0.25 g of the powdered matrix.

19. The method of claim 1, wherein the capsule shell comprises a gelatin material.

20. The method of claim 1, wherein the gel capsule further comprises free dsRNA that is not bound to the powdered matrix.

\* \* \* \* \*